(12) United States Patent
Mittal et al.

(10) Patent No.: US 11,563,639 B1
(45) Date of Patent: Jan. 24, 2023

(54) LOGICAL TRANSPORT OVERLAYED OVER A PHYSICAL TRANSPORT HAVING A TREE TOPOLOGY

(71) Applicant: Xilinx, Inc., San Jose, CA (US)

(72) Inventors: Millind Mittal, Saratoga, CA (US); Jaideep Dastidar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 713 days.

(21) Appl. No.: 16/025,762

(22) Filed: Jul. 2, 2018

(51) Int. Cl.
*H04L 41/12* (2022.01)
*H04L 41/0803* (2022.01)

(52) U.S. Cl.
CPC .......... *H04L 41/12* (2013.01); *H04L 41/0803* (2013.01)

(58) Field of Classification Search
CPC . H04L 41/12; H04L 41/0803; H04L 41/0813; H04L 41/0823; H04L 41/0826; H04L 2012/5609; H04L 2012/5623; H04L 12/6418; H04L 2012/6432; H04L 29/08315; G06F 2213/0026; G06F 2213/0024; G06F 13/4221; G06N 3/04
See application file for complete search history.

(56) References Cited

U.S. PATENT DOCUMENTS

| 10,394,747 | B1 * | 8/2019 | Paneah | ................ | G06F 13/4282 |
| 2004/0095946 | A1 * | 5/2004 | Baker | .................... | H04L 12/44 370/405 |
| 2012/0079156 | A1 * | 3/2012 | Safranek | ............. | G06F 12/0835 710/305 |

OTHER PUBLICATIONS

CCIX Consortium, CCIX Base Specification Revision 1.0a Version 1.0 for Evaluation, Jul. 8, 2019, Whole Document. (Year: 2019).*

* cited by examiner

*Primary Examiner* — Benjamin R Bruckart
*Assistant Examiner* — Tien M Nguyen
(74) *Attorney, Agent, or Firm* — Patterson + Sheridan, LLP

(57) ABSTRACT

In an example, a system specifies a first configuration of the physical transport network that models a plurality of devices as a corresponding first plurality of nodes having a tree topology. Each node of the first plurality of nodes has at least one first device identifier and at least one first connection identifier to other nodes in the tree topology. The system specifies a second configuration of the logical transport network that models the plurality of devices as the first plurality of nodes having a non-tree topology. Each node of the first plurality of nodes has at least one second device identifier, at least one second connection identifier to other nodes in the non-tree topology, the at least one first device identifier, and the at least one first connection identifier of the tree topology. The system folds the logical transport network over the physical transport network using the at least one second device identifier, at least one second connection identifier to other nodes in the non-tree topology, the at least one first device identifier, and the at least one first connection identifier of the tree topology.

20 Claims, 14 Drawing Sheets

LOGICAL TRANSPORT OVERLAYED OVER A PHYSICAL TRANSPORT HAVING A TREE TOPOLOGY

TECHNICAL FIELD

Examples of the present disclosure generally relate to bus architectures of computing systems and, in particular, to overlaying a logical transport over a physical transport having a tree topology.

BACKGROUND

The Peripheral Component Interconnect Express (PCIe) computer bus system has a tree topology. A fundamental problem with tree topologies is their hierarchical nature. For example, when a source leaf node wants to transmit a message to a destination leaf node, traffic traverses from the source leaf node through a corresponding tree structure to a destination leaf node. Traffic does not traverse directly between the source leaf node and the destination leaf node, but traverses from the source leaf node to its corresponding branch node and thence to a root node of the tree structure, if the destination leaf node is not on that same branch, and then traverses from the root node toward a branch node containing the destination leaf node and then finally to the destination leaf node. Typically, a server/computer system is located at the root node at the top of the hierarchy, and peripheral devices are located at leaf nodes at the bottom of the hierarchy. Thus, there is an inherent performance bias towards traffic from/to the root node, or from/to the branch depending on the location of the source and destination leaf nodes, both in terms of bandwidth and latency. Leaf node to leaf node traffic competes across the same ports with traffic from/to the root node, or branch node. Furthermore, direct leaf node to leaf node traffic incurs additional latency due to the first-up-then-down nature of communication as it traverses the tree.

Therefore, it is desirable to provide a logical transport conforming to a first transport protocol having an arbitrary topology that can be overlayed on a physical transport conforming to a second transport protocol having a tree topology without replacing physical layer hardware of the underlying physical transport and without modifying the second transport protocol.

SUMMARY

Techniques for overlaying a first logical transport of a first transport protocol having an arbitrary topology over a physical transport of a second transport protocol having a tree topology are disclosed. In an example, a method of transparently overlaying a logical transport network over an existing physical transport network includes: specifying a first configuration of the physical transport network that models a plurality of devices as a corresponding first plurality of nodes having a tree topology, wherein each node of the first plurality of nodes has at least one first device identifier and at least one first connection identifier to other nodes in the tree topology; specifying a second configuration of the logical transport network that models the plurality of devices as the first plurality of nodes having a non-tree topology, wherein each node of the first plurality of nodes has at least one second device identifier, at least one second connection identifier to other nodes in the non-tree topology, the at least one first device identifier, and the at least one first connection identifier of the tree topology; and folding the logical transport network over the physical transport network using the at least one second device identifier, at least one second connection identifier to other nodes in the non-tree topology, the at least one first device identifier, and the at least one first connection identifier of the tree topology.

In another example, a system that overlays a first logical transport of a first transport protocol having an arbitrary topology over a physical transport of a second transport protocol having a tree topology includes: a computer processor; and a memory coupled to the computer processor. The computer processor is configured to execute code located in the memory for: specifying a first configuration of the physical transport network that models a plurality of devices as a corresponding first plurality of nodes having a tree topology, wherein each node of the first plurality of nodes has at least one first device identifier and at least one first connection identifier to other nodes in the tree topology; specifying a second configuration of the logical transport network that models the plurality of devices as the first plurality of nodes having a non-tree topology, wherein each node of the first plurality of nodes has at least one second device identifier, at least one second connection identifier to other nodes in the non-tree topology, the at least one first device identifier, and the at least one first connection identifier of the tree topology; and folding the logical transport network over the physical transport network using the at least one second device identifier, at least one second connection identifier to other nodes in the non-tree topology, the at least one first device identifier, and the at least one first connection identifier of the tree topology.

In another example, a non-transitory computer-readable medium comprising instructions that when executed by a computing device cause the computing device to perform a method for overlaying a first logical transport of a first transport protocol having an arbitrary topology over a physical transport of a second transport protocol having a tree topology, the method including: specifying a first configuration of the physical transport network that models a plurality of devices as a corresponding first plurality of nodes having a tree topology, wherein each node of the first plurality of nodes has at least one first device identifier and at least one first connection identifier to other nodes in the tree topology; specifying a second configuration of the logical transport network that models the plurality of devices as the first plurality of nodes having a non-tree topology, wherein each node of the first plurality of nodes has at least one second device identifier, at least one second connection identifier to other nodes in the non-tree topology, the at least one first device identifier, and the at least one first connection identifier of the tree topology; and folding the logical transport network over the physical transport network using the at least one second device identifier, at least one second connection identifier to other nodes in the non-tree topology, the at least one first device identifier, and the at least one first connection identifier of the tree topology.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
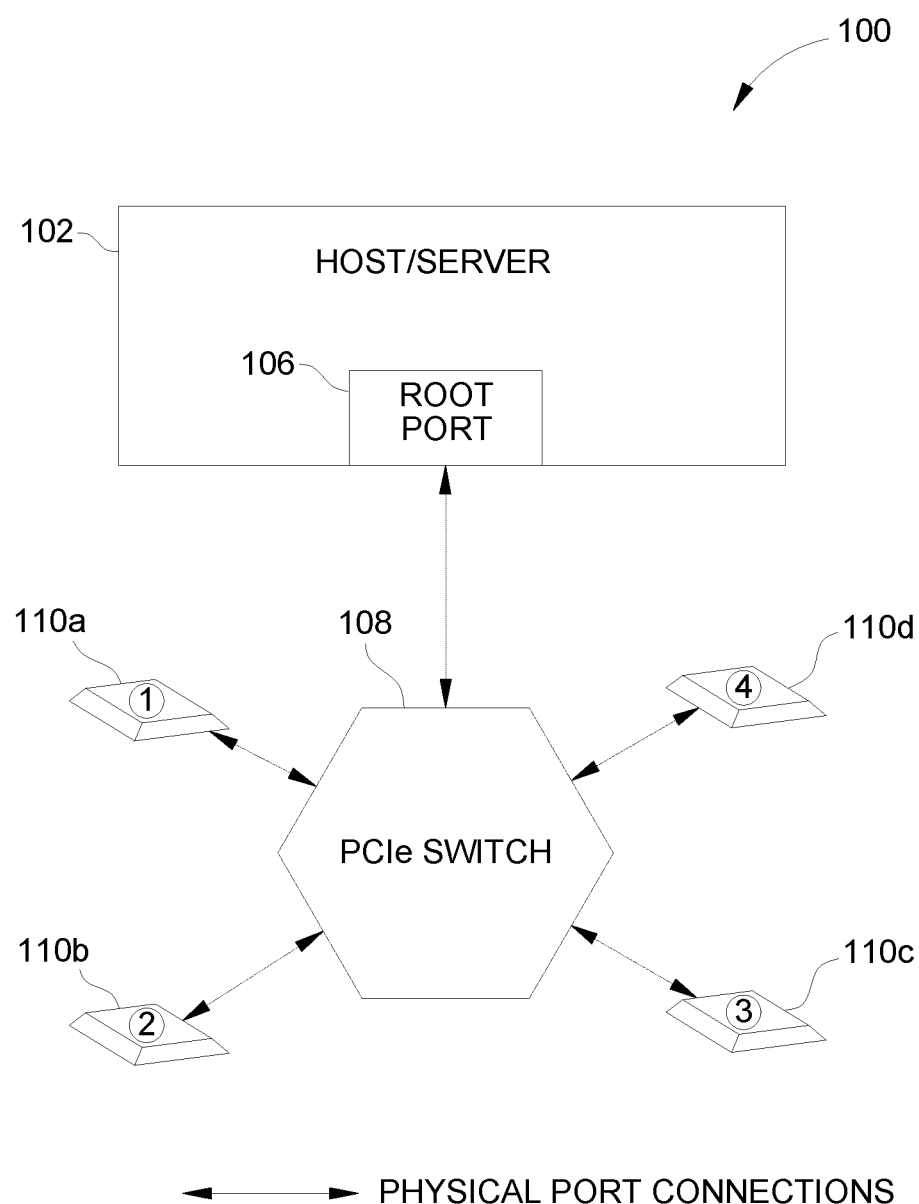
FIG. 1 shows PCIe tree topology connections between a host/server having a root port and 4 PCIe devices.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for overlaying a first logical transport of a first transport protocol having an arbitrary topology over a physical transport of a second transport protocol having a tree topology are disclosed. The techniques disclosed herein allow multi-port devices to be discoverable as part of a PCIe tree topology and thus participate in the PCIe protocol, while also allowing these devices to be transport nodes servicing a common function in complex topologies such as multi-dimensional arrays. The techniques allow a system to concurrently maintain the tree topology properties of PCIe transport, with non-tree topology properties of other transports without switching modes. The original tree-based transport network is active and untouched. The techniques allow for the logical transport routing properties, independent of PCIe tree-based routing properties, achieved with logical transport data structures. These and further aspects are discussed below with respect to the drawings.

Figure 2:
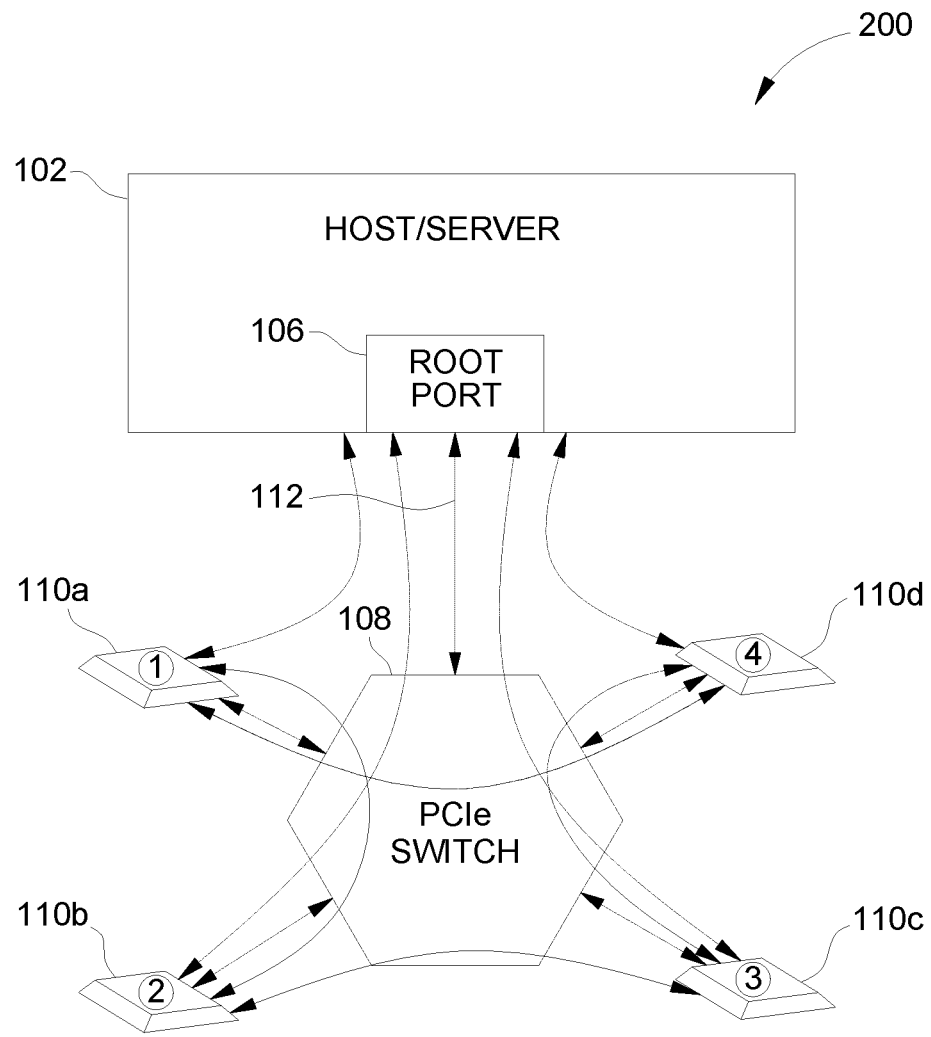
FIG. 2 shows the PCIe tree topology of FIG. 1 further illustrating multiple flows sharing the same physical port connection.

FIG. 1 shows PCIe tree topology 100 connections between a host/server 102 having a root port 106 and 4 PCIe devices 110a-110d. The 4 PCIe devices 110a-110d function as leaf nodes in the PCIe tree topology, the host/server 102 functioning as the root, and a PCIe switch 108 functioning as a multiport branch node between the host/server 102 and the 4 PCIe devices/leaf nodes 110a-110d. FIG. 2 shows traffic flows between all of the components of FIG. 1, including the Host/Server root port 106, the PCIe switch 108, and the four PCIe devices/leaf nodes 110a-110d. PCIe transport protocol and many other transport protocols have physical layer topologies that are tree topologies. In the case of PCIe, the tree topology has associated components such as a Root Port (e.g., the single root port 106 of the host/server 102), Switch Ports (e.g., the multiple ports of the PCIe switch 108) and EndPoints (the single port of the four PCIe devices/leaf nodes 110a-110d) based on the type of transport connection to the components. The PCIe Root Port, Switch Ports and EndPoints allow the creation of the tree equivalents of root, branch and leaf nodes that may be represented as a tree-like (data) structure, respectively. In PCIe, the Host/Server 102 is the root of the tree, the PCIe Devices 110a-110d are the Endpoints, and PCIe Switch 108 is a branch in the tree. The Root Port and the EndPoints have single connections to multi-port PCI switch 108 ports.

Traffic traversing the PCIe tree topology is further identified based on the direction from/to the root port 106 of the tree. For example, traffic away from the root port 106 is deemed to be downstream traffic and traffic towards the root port 106 is deemed to be upstream traffic. Furthermore, PCIe port connections towards the root port 106 of the tree are deemed upstream ports and PCIe port connections towards the leaves of the tree, or away from the root of the tree, are deemed downstream ports.

As noted above, when device 110a wants to transmit a packet to device 110d, the transmitted packet traverses as upstream traffic from a single upstream port on device 110a to a first upstream port on the PCIe switch 108, and thence through a second downstream port on the PCIe switch 108 to the single downstream port of the device 110d. Inefficiencies in available bandwidth results from packets transmitted from one leaf node (e.g., 110a) to another leaf node (110d) need to compete for resources of the PCIe switch 108 with packets from the root port 106 to the same destination leaf node (110d) as shown in FIG. 2. In FIG. 2, multiple flows share the same physical port connection. Leaf Node to Leaf Node traffic competes across the same ports with traffic from/to the Root Port as well as traffic from/to other Leaf Nodes. Furthermore, direct Leaf Node to Leaf Node traffic incurs additional latency due to the first-up-then-down nature of communication as it traverses the tree.

The PCIe transport architecture has a property that permits a device to employ multiple logical transports to be of multiple component types, each serving a unique, distinct function. Thus, multiple logical transport connections to the root port, switch ports and endpoints are configurable as multiple logical unique, distinct root port, switch ports and endpoints. In a device supporting cache coherence such as CCIX (Cache Coherence Interconnect for Accelerators), the disclosed technique allows multi-port devices to be discoverable as part of a PCIe tree topology and thus participate in the PCIe physical layer protocol, while also allowing these devices to be multi-port logical transport nodes servicing a common function such as CCIX, in complex topologies such as multi-dimensional arrays.

Examples of the present disclosure take advantage of the aforementioned properties of the PCIe transport protocol to provide a method and system that allows devices to be discoverable as multiple, one port nodes as part of a PCIe tree physical transport topology and thus participate in the PCIe protocol, while also concurrently allowing these multi-port devices to be multi-port logical nodes in complex, multi-dimensional array topologies participating in another logical transport protocol, for example CCIX. These multi-port logical nodes, although connected via multiple physical transports, can service a common function that is not a PCIe function (PCIe only has a notion of functions being unique to a port).

Nodes in the tree topology, with singular paths between nodes that service single leaf node/port tree topology-based function, are folded to create multi-dimensional topologies that concurrently service a different function between nodes. Examples allow a system to concurrently maintain the tree topology properties of PCIe transport, with non-tree multi-port topology properties of other transports, without switching modes. The original tree-based transport network is active and untouched. An example of the overall method is the folding of a tree structure with singular paths between nodes in order to create 2-dimensional and 3-dimensional topologies with multiple logical transport paths between nodes.

Examples allow devices to selectively declare their participation in the PCIe tree topology as components with existing PCIe semantics such as PCIe Switch, or PCIe Endpoint semantics. This includes selecting which port of the multi-port device declares itself as a Root Port, Upstream Port, Downstream Port, or Endpoint. Examples permit a network of nodes to continue to maintain PCIe tree semantics and service PCIe functions concurrently with other functions, such as CCIX, which have their own topology semantics.

The method allows for logical transport routing properties of non-tree topology transport protocols to exist, independent of PCIe tree based routing properties, achieved with logical transport data structures such as Load/Store transport with System Address Map (SAM) and ID Map (IDM) data structures for CCIX.

The method allows PCIe devices to contain an embedded PCIe switch, and declare multiple PCIe port designations. The port designations are effected in such a manner that the tree topology, with single path connections, can later be folded into multi-dimensional topologies between nodes, where each node in that multi-dimensional topology services a common function, different from PCIe, but concurrently with PCIe.

Figure 3:
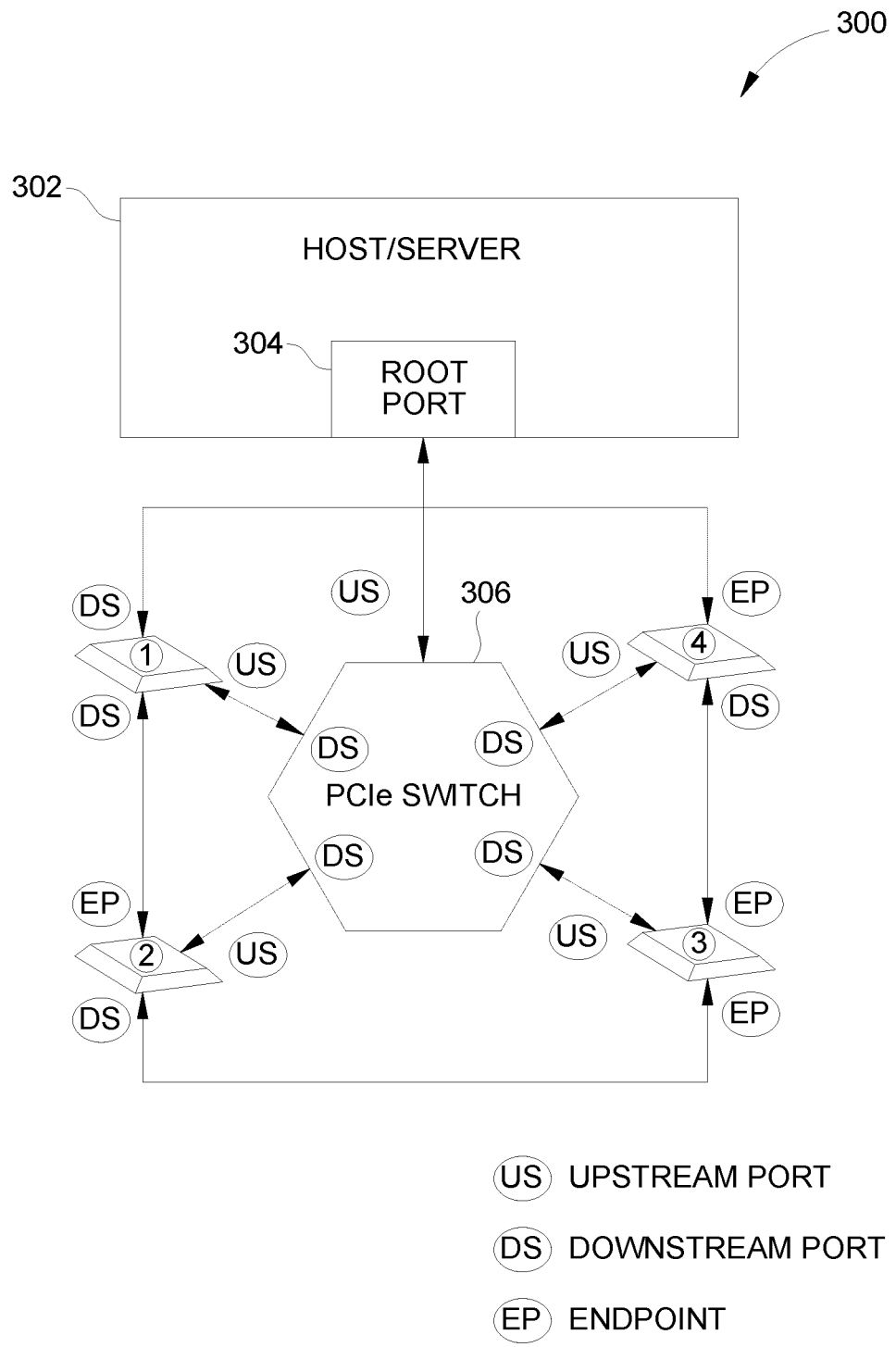
FIG. 3 illustrates one example of the present disclosure, wherein nodes of devices having single edges/connections/to other nodes/devices in a tree topology can be represented simultaneously as nodes having multiple connections/edges to other nodes in an arbitrary non-tree topology wherein a node has a single device identifier but multiple edge/connection identifiers.

FIG. 3 illustrates one example of the present disclosure, wherein nodes of devices having single edges/connections to other nodes/devices in a tree topology can be represented simultaneously as nodes having multiple edges/connections to other nodes/devices in an arbitrary non-tree topology wherein a node has a single device identifier but multiple connection/edge identifiers. Each node is shown as having an embedded PCI-switch therein while declaring different PCIe port connection/edges (upstream ports, downstream ports, or end ports).

Figure 4:
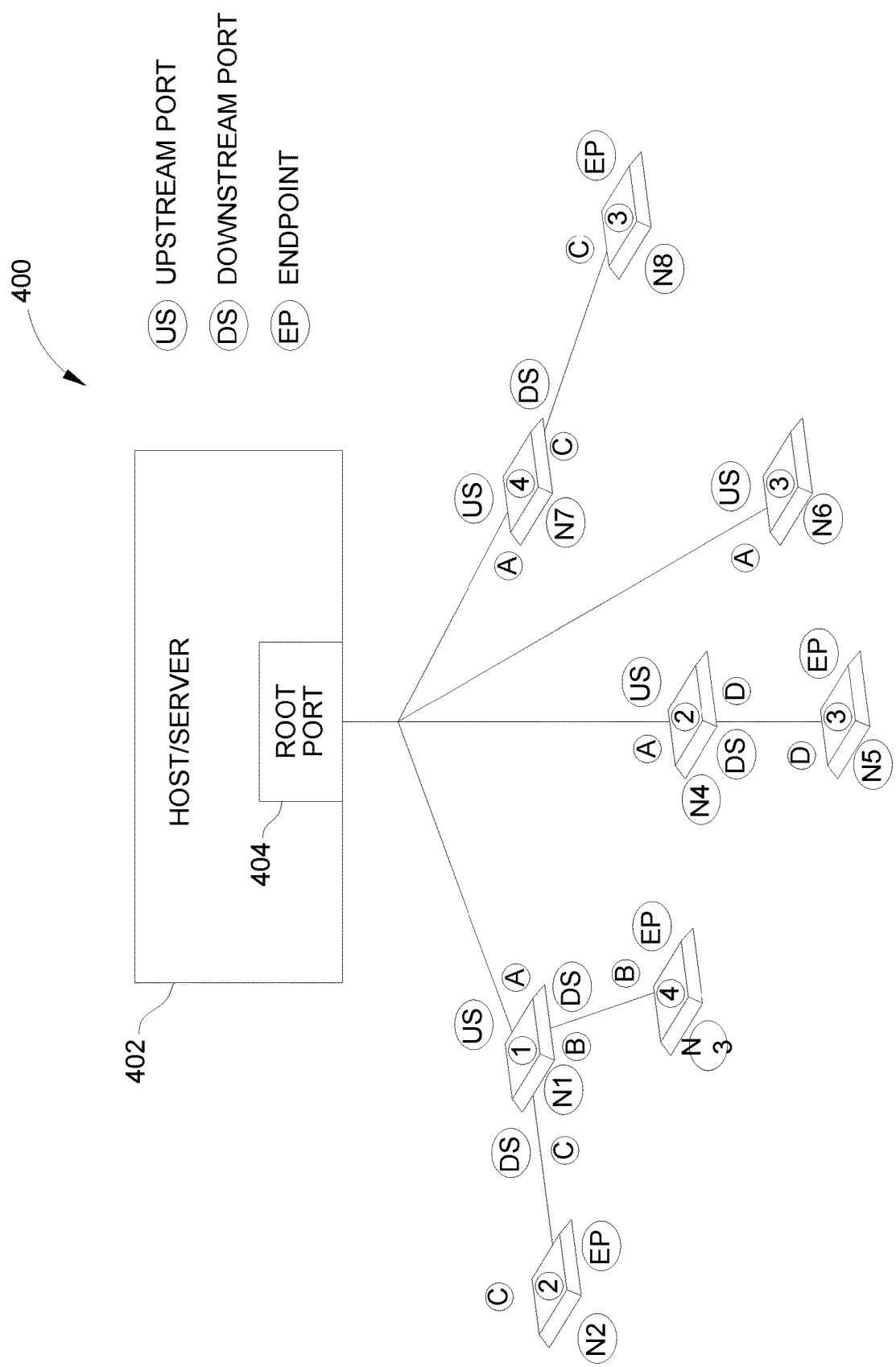
FIG. 4 shows a tree topology of a PCIe physical transport according to an example of the present disclosure.
Figure 5:
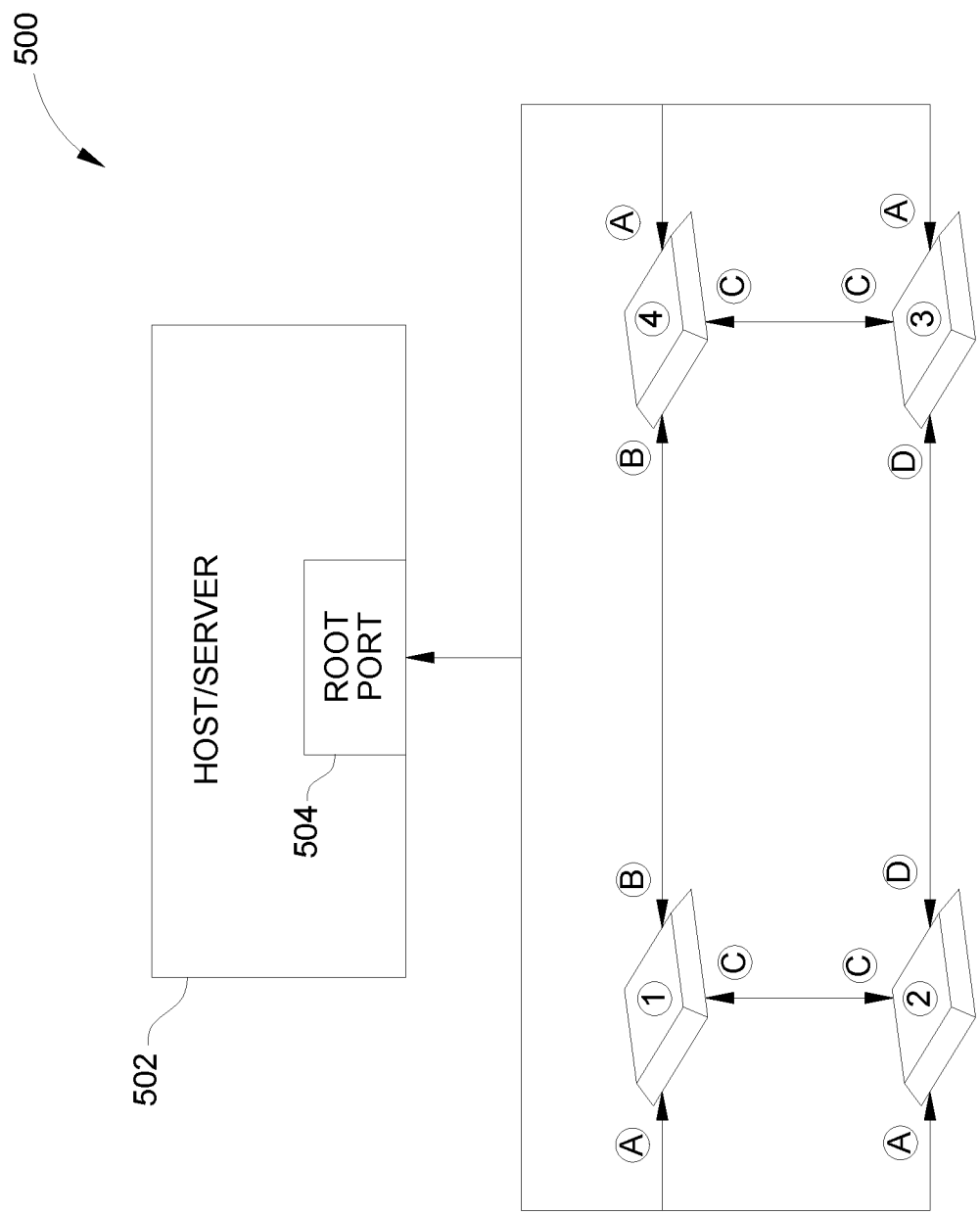
FIG. 5 shows the same ports/nodes, previously illustrated in FIG. 4, folded to represent a mesh topology (i.e., a non-tree topology).

FIG. 4 shows a tree topology 400 of a PCIe physical transport according to an example of the present disclosure. FIG. 5 shows the same ports/nodes, previously illustrated in FIG. 4, folded to represent a mesh topology 500 (i.e., a non-tree topology) Referring now to FIGS. 4 and 5, examples of the present disclosure involve creating structures/graphs/topologies between a network of devices using pairwise relations between the devices. The devices are considered to be vertices, objects or nodes in a graph (graphs are henceforth also referred to as topologies). Examples define pairwise relationships between devices such that the same devices have node positions in the tree topology 400 (FIG. 4) while simultaneously having a different node position in another, arbitrary topology, e.g. a star and/or mesh topology 500 (FIG. 5). Examples enable the same four physical components, device 1 to device 4 of the mesh topology of FIG. 4 to participate in, and simultaneously identify themselves as part of both the tree graph 400 of FIG. 4 and the star-mesh graph 500 of FIG. 5. In doing so, the star-mesh graph transport protocol can transparently communicate between the star-mesh graph nodes via an overlay on the tree graph 400.

The pairwise relations between the devices are achieved by physical transport connections following a particular transport protocol, e.g. PCIe, and these transport connections can be considered as lines/edges in a graph, with each end of the line/edge being a port on the device. For example, in FIG. 4, device 1, as node N1 in the tree graph 400, has a pairwise relation with the Host/Server device 402 as well as device 2 and device 4, each being the root node, node N2, and node N4 in the tree graph 400, respectively. The three ports on node N1 have lines/edges that are single transport connections to the root node, node N2, and node N4. The lines/edges in a graph 400, i.e. the physical transport connections, may additionally have directional properties further describing the pairwise relations between the devices. These directional properties can be unique to the protocol (e.g. PCIe). For the case of PCIe, examples of directional properties include upstream port (direction towards the root of the tree), downstream port (direction away from the root of the tree), and endpoint (leaf node of the tree). For example, in FIG. 4, the line from device 1 to the root node 404 has an upstream directional property, whereas the lines/edges from device 1 to device 2 and device 4 have a downstream directional property. On the other hand, the device 2 line/edge to device 1 has declared itself to be the leaf node from device1 and therefore has an endpoint directional property.

Examples of the present disclosure further include creating a set of node and line/edge identifiers unique to the base topology, e.g. a base tree topology. For the case of PCIe (FIG. 4), the port identifiers are the bus and device number. Certain protocols like PCIe, in order to maintain a tree topology, have restrictions on the lines/edges emerging from a node. For example, in FIG. 4, the 3-Port device 1 has three identifiers with three unique <BusNumber, DeviceNumber> tuples, referred in FIG. 4 with the monikers 1A, 1B, and 1C, respectively.

Now because of constraints inherent in the PCIe's tree topology 400, device 2 is seen as two distinct PCIe devices: The first device is a PCIe device with a 2C identifier and declared as being the leaf of Device 1, and the 2C port therefore has an endpoint directional property. The second device is a PCIe device configured as a branch node with 2 ports: a port with the upstream directional property which is given a 2A identifier and connected to the device 402 with the root port, and a port with the downstream directional property and given the 2D identifier and connected to device 3. Note, while Ports 2A and 2D have declared themselves to be part of a common node/device in the tree topology 400, from a (PCIe) tree topology perspective, that node/device has no relation (or graph pairwise relation) to the PCIe device declared as the endpoint 2C.

Examples of the present disclosure further include creating a parallel set of node and line/edge identifiers for the overlay topology, e.g. a CCIX star-mesh topology 500. Identifiers used in the overlay topology may include node or line identifiers that are unique to the overlay topology in order to achieve logical transport and routing unique to the overlay topology. For example, in FIG. 5, devices 1, 2, 3 and 4 have CCIX Device ID 1, 2, 3, and 4 as their node identifiers. Meanwhile, the host/server device 502 has the CCIX Device ID 0 identifier. These CCIX Device ID identifiers are unique to the overlay topology 500, i.e., the PCIe tree topology 400 is unaware of these identifiers.

Identifiers used in the overlay topology may include node or line identifiers from the base tree topology 400 in order to transparently achieve logical transport and routing leveraging the identifiers of the base tree topology 400. For example, in FIG. 4, the node in the star-mesh graph with CCIX device ID 1 has 3 lines representing the 3 transport connections with adjacent nodes. The ports for these lines have CCIX identifiers of Port ID 0, 1, and 2 that are unique to that CCIX device ID 1. Port ID 0, 1, and 2 are given a binding/association to the PCIe identifiers 1A, 1B, 1C respectively in order to maintain the pairwise relations with CCIX device ID 0, 4, and 2, respectively. Thus, CCIX device 1 uses the same line identifiers 1A, 1B, and 1C from the PCIe topology 400 in FIG. 4 for the star-mesh topology 500 in FIG. 5 in order to transparently achieve logical transport and routing between nodes over the PCIe physical transport.

The overlay topology 500 may also include direction properties unique to the logical protocol on the overlay topology 500. For example, in FIG. 5, the star-mesh topology 500 inherently contains loops. It may be undesirable for a logical transport sourced by a node (N1 in FIG. 5) to reappear at the same node destination (back to N1 via the N1=>N2=>N3=>N4=>N1 loop). The logical transport may then have rules such that for topologies with loops, traffic with a source node identifier are not routed if the next destination node identifier is the same as the source node identifier (so the N4=>N1 step is not achieved in the example).

In summary, the identifiers for CCIX contain port identifiers (CCIX Port ID) and a separate device identifier which is the CCIX Device ID. CCIX makes a distinction between a port identifier and device identifier in such a manner, that unlike PCIe, the same device identifier is used to identify a common logical association across multiple port identifiers: For example, a device with one CCIX port has one CCIX port ID and a separate CCIX device ID. A device with multiple CCIX ports has multiple CCIX port IDs, but those CCIX ports all share a common CCIX device ID. Examples involve creating and utilizing the identifiers from the base topology 400 and the overlay topology 500 such that protocols native to each topology can communicate messages between nodes in their respective topologies concurrently, using the set of identifiers unique to that topology. Additionally, the method involves creating and utilizing routing tables from the base topology 400 and the overlay topology 500 such that protocol messages native to each topology are routed between nodes based on the source and destination identifiers in combination with the routing tables unique to that topology.

Communication and routing across a tree topology, e.g. PCIe, takes place by traversing the tree topology 400 based on the identifiers in the tree topology protocol packet and tree topology identifier based routing tables. Communication and routing across the overlay/star-mesh topology 500, e.g. CCIX, takes place by traversing the particular overlay/star-mesh topology 500 based on a combination of identifiers from the tree and overlay topology as well as overlay topology specific routing tables. Accordingly, the examples illustrate how pairwise relations between devices are defined in a manner that the same devices have node positions in the tree topology 400 while simultaneously having a different node position in another, arbitrary topology, e.g., star and/or mesh topology 500. For example, device 2 in FIG. 4 is seen as two distinct nodes—a leaf node N2 and branch node N4 in the tree topology 400, while at the same time, the same device 2 in FIG. 5 is seen as just one star-mesh node 2 in the CCIX star-mesh topology 500 via the identifier scheme described above. Device 3 in FIG. 4 is seen as two nodes—a leaf node N5 and leaf node N6 in the tree topology 400, while at the same time, the same device 3 in FIG. 5 is seen as just one node 3 in the CCIX star-mesh topology 500. Device 4 in FIG. 4 is seen as two distinct nodes—a leaf node N3 and branch node N7 in the tree topology 400, while at the same time, the same device 4 in FIG. 5 is seen as just one star-mesh node 4 in the CCIX star-mesh topology 500.

Figure 6:
FIG. 6 is a block diagram depicting a system for overlaying a first logical transport of a first transport protocol having an arbitrary topology over a physical transport of a second transport protocol having a tree topology, according to an example.

FIG. 6 is a block diagram depicting a system 600 for overlaying a first logical transport of a first transport protocol having an arbitrary topology over a physical transport of a second transport protocol having a tree topology, according to an example. The system 600 includes a computer system 602. The computer system 602 includes a hardware platform ("hardware 604") and a software platform ("software 606") executing on the hardware 604. The hardware 604 includes a processing system 610, system memory 616, storage devices ("storage 618"), and a peripheral device 622. The software 606 includes an operating system (OS) 644, device drivers 648, applications 650. The OS 644 is further configured to implement a combined CCIX/PCIe protocol stack 652 configured to implement the CCIX transaction layer of the CCIX logical transport over the PCIe data link layer and physical layer of the PCIe physical transport according to examples. The software 606 is also configured to specify a first configuration of the physical transport network that models a plurality of devices as a corresponding first plurality of nodes having a tree topology. Each node of the first plurality of nodes has at least one first device identifier and at least one first connection identifier to other nodes in the tree topology. The software 606 is further configured to specify a second configuration of the logical transport network that models the plurality of devices as the first plurality of nodes having a non-tree topology. Each node of the first plurality of nodes has at least one second device identifier, at least one second connection identifier to other nodes in the non-tree topology, the at least one first device identifier, and the at least one first connection identifier of the tree topology. The software 606 is further configured to fold the logical transport network over the physical transport network using the at least one second device identifier, at least one second connection identifier to other nodes in the non-tree topology, the at least one first device identifier, and the at least one first connection identifier of the tree topology.

The processing system 610 further includes a microprocessor 612, support circuits 614, and a peripheral bus 615. The microprocessor 612 can be any type of general-purpose central processing unit (CPU), such as an x86-based processor, ARM®-based processor, or the like. The microprocessor 612 can include one or more cores and associated circuitry (e.g., cache memories, memory management units (MMUs), interrupt controllers, etc.). The microprocessor 612 is configured to execute program code that perform one or more operations described herein and which can be stored in the system memory 616 and/or the storage 618. The support circuits 614 include various devices that cooperate with the microprocessor 612 to manage data flow between the microprocessor 612, the system memory 616, the storage 618, the peripheral device 622, or any other peripheral device. For example, the support circuits 614 can include a device set (e.g., a north bridge, south bridge, platform host controller, etc.), voltage regulators, firmware (e.g., a BIOS), and the like. The support circuits 614 manage data flow between the microprocessor 612 and the peripheral bus 615, to which various peripherals, such as the peripheral device 622, are connected. In some examples, the microprocessor 612 can be a System-in-Package (SiP), System-on-Device (SoC), or the like, which absorbs all or a substantial portion of the functionality of the device set (e.g., north bridge, south bridge, etc.). The peripheral bus can implement an expansion bus standard, such as Peripheral Component Interconnect Express (PCIe). In the example, the processing system 610 is shown separate from the peripheral device 622. In other examples discussed further below, the processing system 610 and the peripheral device 622 can be implemented on the same integrated circuit (IC).

The system memory 616 is a device allowing information, such as executable instructions and data, to be stored and retrieved. The system memory 616 can include, for example, one or more random access memory (RAM) modules, such as double-data rate (DDR) dynamic RAM (DRAM). The storage 618 includes local storage devices (e.g., one or more hard disks, flash memory modules, solid state disks, and optical disks) and/or a storage interface that enables the computer system 602 to communicate with one or more network data storage systems. The hardware 604 can include various other conventional devices and peripherals of a computing system, such as graphics cards, universal serial bus (USB) interfaces, and the like.

The peripheral device 622 includes a programmable IC 628, a non-volatile memory 624, and RAM 626. The programmable IC 628 can be a field programmable gate array (FPGA) or the like or an SoC having an FPGA or the like. The NVM 624 can include any type of non-volatile memory, such as flash memory or the like. The RAM 626 can include DDR DRAM or the like. The programmable IC 628 is coupled to the NVM 124 and the RAM 626. The programmable IC 628 is also coupled to the peripheral bus 615 of the processing system 610. The programmable IC 628 may further include PCIe circuit logic 630A implementing the physical layer of the peripheral bus 615, and include CCIX custom logic 630B for implementing hardware features custom to CCIX transport protocol aware devices, such as the peripheral device 622, and for implementing CCIX firmware 619.

The OS 644 can be any commodity operating system known in the art, such as such as Linux®, Microsoft Windows®, Mac OS®, or the like. The combined CCIX/PCIe protocol stack 652 includes drivers and libraries that provide application programming interfaces (APIs) to the peripheral device 622 for command and control thereof. Device drivers 648 include software executing on the microprocessor 612 that communicate with the peripheral device 622 through the device drivers 646 to perform various testing and like type functions. The applications 650 include software executing on the microprocessor 612 that invokes the peripheral device 122 through the combined CCIX/PCIe protocol stack 652 to transmit CCIX/PCIe attributes and transaction layer packets (TLPs). The applications 650 can include neural network, video processing, network processing, or the like type applications that offload some functions to the peripheral device 622.

The CCIX architecture specification comprises five discrete logical layers. These include a CCIX protocol layer, a CCIX link layer, and the CCIX transaction layer. The CCIX transaction layers, data link and physical layers together are referred to as CCIX logical transport. The CCIX architectural specification also includes the PCIe transaction layer, PCIe data link layer and PCIe physical layer. Each of these layers is divided into two sections: one that processes outbound (to be transmitted) information and one that processes inbound (received) information.

Before the system 600 can overlay a logical transport of a first transport protocol having an arbitrary topology over a physical transport of a second transport protocol having a tree topology, the system 600 needs to first transparently overlay a logical transport network over an existing physical transport network. To this effect, examples of the preset disclosure leverage available PCIe mechanisms that satisfy the requirements of the CCIX logical transport. The CCIX logical transport attributes are overlaid on PCIe defined mechanisms located in its physical electrical and physical logical layers, its data link layer, and its transaction layer with vendor defined messages (VDMs). Examples of the present disclosure define new mechanisms, when those mechanisms are needed for the logical transport, but not available natively on the physical transport. This mechanism involves designating a PCIe Virtual Channel (VC) where PCIe VDMs on that VC contain properties unique to the CCIX logical transport. The properties include Class of Service attributes, and CCIX virtual channels transported within that designated PCIe VO virtual channel. The CCIX functions derived from those properties are available universally over devices connected via the PCIe transaction layer, since these VDMs are transparently carried over PCIe.

Examples of the present disclosure further permit for the creation of optimized transaction layer packets (TLP), different from the PCIe standard TLP, that are carried only from one device with that designated VC to another device with that same designated VC. The optimized TLP contain low-latency and protocol attributes that are specific to CCIX.

Figure 7:
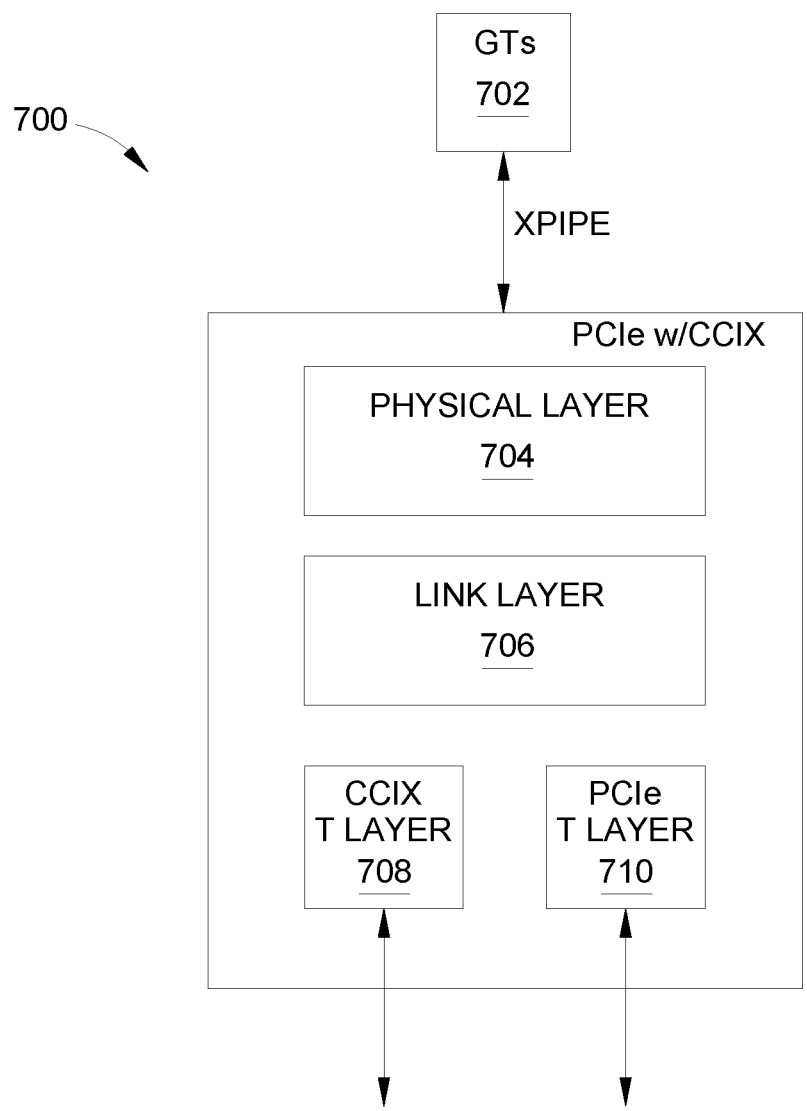
FIG. 7 shows a PCIe device with CCIX functionality which permits the PCIe device to have load/store and coherency semantics over PCIe.

FIG. 7 shows a PCIe device 700 with CCIX functionality which permits the PCIe device 700 to have load/store and coherency semantics over PCIe. The PCIe device 700 is coupled to one or more gigabit transceivers (GTs) 702. The PCIe device 700 retains the PCIe physical layer 704 and the PCIe data link layer 706 of the PCIe physical transport, but permits the PCIe transaction layer 708 to exit alongside with the CCIX transaction layer 710 so that CCIX-aware devices can employ features of the CCIX transport. The CCIX specification does not modify the PCIe transaction layer 708. The primary responsibility of the PCIe transaction layer 708 is the assembly and disassembly of transaction layer packets (TLPs). TLPs are used to communicate transactions (e.g., read, write), as well as certain types of events. The PCIe transaction layer 708 is also responsible for managing credit-based flow control for TLPs. The CCIX specification does not modify the PCIe data link layer 706 and the PCIe physical layer 704 and utilizes it as is. The PCIe data link layer 706 functions as an intermediate stage between the PCIe transaction layer 708 and the CCIX transaction layer 710. The primary responsibilities of the PCIe data link layer 706 include link management and data integrity, including error detection and error correction.

The method of transparently overlaying a logical transport network over an existing physical transport (e.g., PCIe) defines a new transaction layer, e.g., the CCIX transaction layer 710. The CCIX transaction layer 710 replaces the PCIe transaction layer 708 in one of the PCIe Virtual Channels (VCs) in a multi-VC implementation. The CCIX transaction layer 710 is a reduced PCIe transaction layer which supports optimized CCIX-compatible TLPs and PCIe-compatible TLPs.

The CCIX Transaction Layer's primary responsibility is the assembly and disassembly of CCIX Transaction Layer Packets (TLPs). On a receive path, the CCIX transaction layer 710 checks CCIX TLP integrity, before forwarding the TLP to the PCIe data link layer 706. For PCIe Compatible TLPs, the PCIe transaction layer 708 checks specified in the PCI Express Base Specification are applicable. For Optimized TLPs, a new set of CCIX Transaction Layer checks are specified.

The CCIX transaction layer 710 is also responsible for managing credit-based flow control for CCIX TLPs. On the receive path, posted flow control credits are returned for CCIX TLPs that pass data integrity checks and are forwarded to the CCIX transaction layer. In the transmit path, a credit gate is implemented to control flow of CCIX TLPs based on available posted credit. These posted credits are defined on a link-wide basis.

CCIX uses packets (TLPs) to communicate information over the PCIE data link layer 706 and physical layer 704. As the transmitted packets flow downstream through CCIX transaction layer 710, the PCIE data link layer 706, and the PCIe physical layer 704, the CCIX packets are extended with additional information necessary to handle packets at each of the aforementioned layers. At a receiving side, a reverse process occurs and packets are transformed from a PCIe physical layer 204 representation to a PCIE data link layer 706 representation and finally (for Transaction Layer Packets) to the form that can be processed by the CCIX transaction layer 710 of the receiving device.

CCIX transport is over a designated PCIe virtual channel. The designated VC enables performance isolation from other PCIe traffic and also prevents resource dependency deadlocks with other PCIe traffic. CCIX protocol messages are transmitted via third party PCIe vendor defined messages (VDMs). PCIe VDMs leverage an ordering properties of VDMs and the performance property of VDMs being a posted, i.e., fire & forget, transaction. A sender does not need to wait for a packet to be acknowledged and can also rely on the PCIe ordered network delivering multiple VDMs in temporal order. With a designated VO for CCIX traffic, the CCIX transaction layer 710 can be designated. Traffic appearing over PCIe transport bifurcates to the CCIX transaction layer 710 or the PCIe transaction layer 708, depending on whether the traffic is on the CCIX or non-CCIX VC. This offers latency and bandwidth advantages, which are important to load/store and coherency protocols in general. Also, a CCIX transaction layer 710 that is independent of PCIe also offers latency and performance advantages by permitting features not available in the PCIe transaction layer—this includes CCIX request chaining and CCIX message packing.

Figure 8:
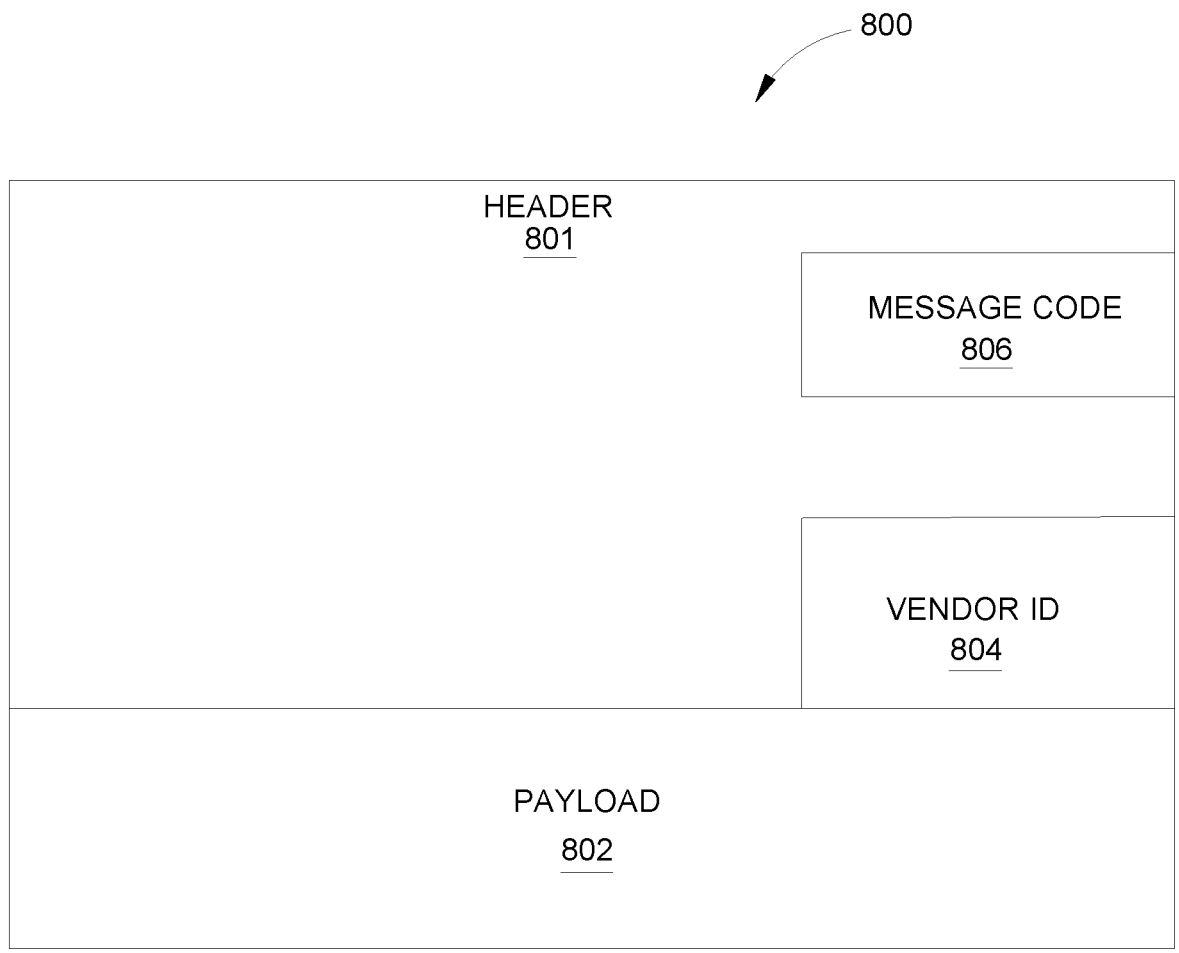
FIG. 8 shows a layout of a PCIe packet.

FIG. 8 shows a layout of a PCIe/TLP packet 800. The PCIe/TPL packet 800 includes a header 801 and a payload 802. The OS 644 creates and employs a PCIe virtual channel for handling packet traffic between devices. Once vendor defined VDMs are detected by the OS 644, the CCIX firmware 619 creates a PCIe virtual channel in the CCIX transaction layer 710 that is not known to the PCIe transaction layer 708. Once the CCIX custom logic 630B discovers the presence of the CCIX-designated PCIe virtual channel, the CCIX custom logic 630B enables the CCIX-designated PCIe virtual channel and then proceeds to discover whether PCIe packets located in the combined CCIX/PCIe protocol stack 652 contain vendor defined messages in its packets that are recognizable to CCIX-based devices. PCIe is configured to recognize an existing third party vendor identifier (ID) and a third party packet type within its protocol called a vendor defined message. CCIX uses vendor defined messages that every CCIX-based device from any vendor of CCIX can recognize and employ in communication. The PCIE transaction layer 708 recognizes PCIE attributes on the CCIX virtual channel, and is unaware that these attributes are designated as CCIX attributes that extend the capabilities of PCIe.

Referring to FIGS. 6 and 8, CCIX-aware firmware 619 detects in a PCIE compatible PCIe/TLP packet 800 having a vendor-specific identifier called a vendor ID 804 in the header 801. The CCIX firmware 619 then examines a message code field 806 in the header 801 that identifies the packet as a vendor defined message. In response to detecting the CCIX header (not shown) containing a VDM associated with CCIX-communication, the CCIX-aware firmware 619 examines the content of the CCIX-based header of a CCIX TLP embedded within the PCIe/TLP packet 800 to determine how to process the packet. The CCIX firmware 619 then informs the CCIX Aware OS 644 that information contained in the VDM is associated with a CCIX-aware application, and that the CCIX aware OS 144 should expect to process one or more CCIX-type TLPs received over the CCIX transaction layer 710.

CCIX further employs a software data structure that is a counterpart to that vendor defined message is called Device Vendor Specific Expended Capabilities (DVSEC). This DVSEC software data structure is device vendor specific. When the OS 644 recognizes a DVSEC vendor defined message identifier, the OS 644 recognizes that accompanying DVSEC packet has additional attributes not recognizable by PCIe. The OS 644 then consults the CCIX-aware firmware 619 to interpret the DVSEC attribute and packet. Thus, the PCIe portion of the OS 644 is made aware that it needs to handle CCIX packets, but remains unaware how to interpret the packet's embedded attributes. The OS 644 then forwards the DVSEC message to the CCIX transaction layer 710 of the combined CCIX/PCIe protocol stack 652 and the CCIX firmware 619 for further interpretation.

Figure 9:
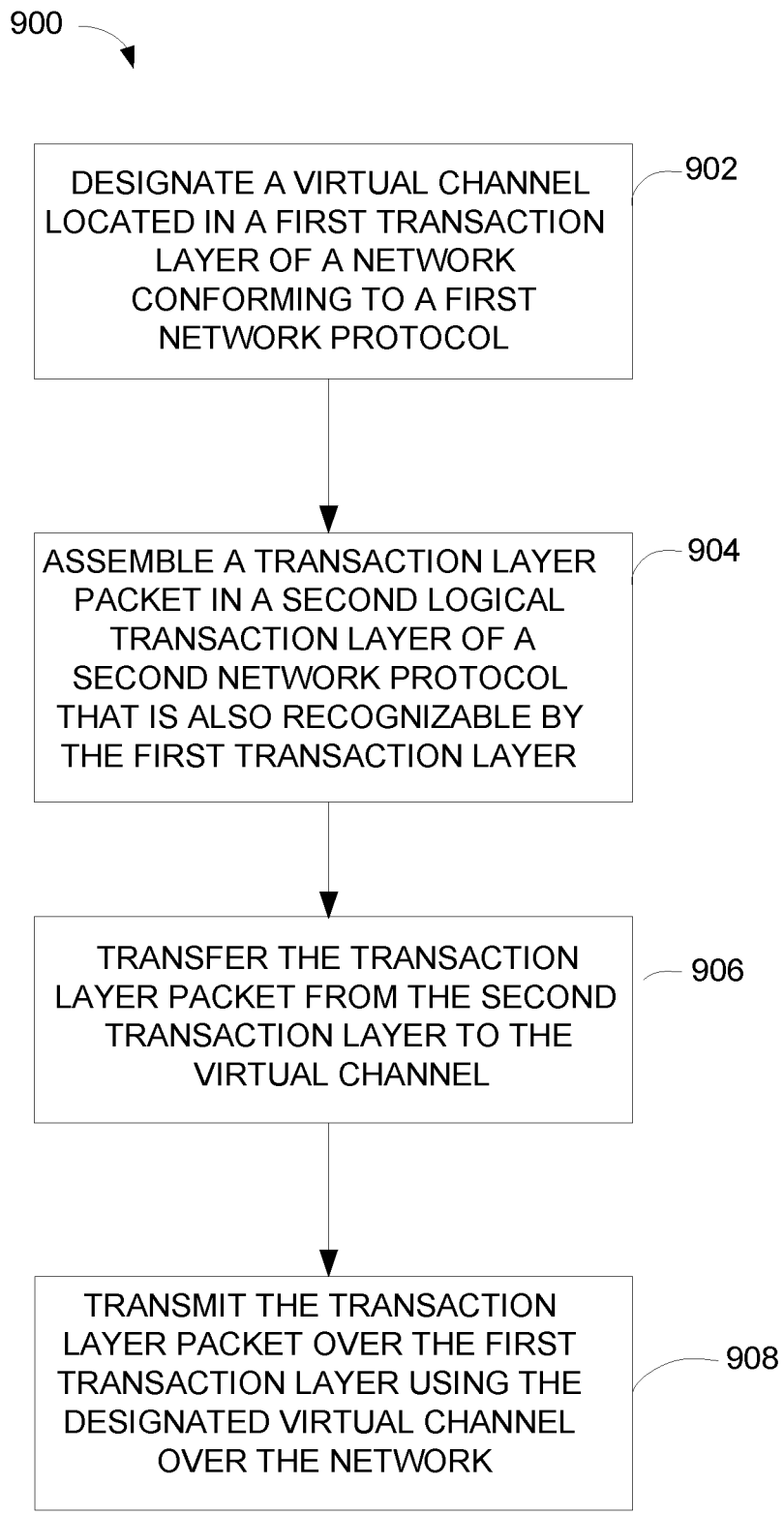
FIG. 9 is a flow diagram depicting a first method for transparently overlaying a logical transport network over an existing physical transport network according to an example.

FIG. 9 is a flow diagram depicting a first method 900 for transparently overlaying a logical transport network over an existing physical transport network according to an example. Aspects of the method 900 may be understood with reference to FIGS. 1-8. The method 900 begins at block 902, where computer system 602 designates a virtual channel located in a first transaction layer of a network conforming to a first network protocol. At block 904, the computer system 602 assembles a transaction layer packet in a second logical transaction layer of a second network protocol that is also recognizable by the first transaction layer. At least one attribute contained within the transaction layer packet is not recognizable to the first transaction layer, but remaining fields of the packet are recognizable by the first transaction layer. The remaining fields of the packet are unique to the second logical transaction layer.

In an example, the transaction layer packet includes a third party identifier recognizable to the first transaction layer, and a third party message type and a third-party header recognizable to the second logical transaction layer. At block 906, the computer system 602 transfers the transaction layer packet from the second transaction layer to the virtual channel. At block 908, the computer system 602 transmits the transaction layer packet over the first transaction layer using the designated virtual channel over the network. In an example, the first transaction layer transmits the transaction layer packet over a data link layer and a physical layer that conforms to the first network protocol.

In an example, the second transaction layer leverages existing properties of the physical layer, but employs class of service (COS) attributes that are unique to the second logical transaction layer. The COS attributes are at least one of low latency attributes and protocol attributes.

In an example, the second network protocol is cache coherent. In an example, the first network protocol is the PCIe protocol and the second network protocol is the CCIX protocol.

Figure 10:
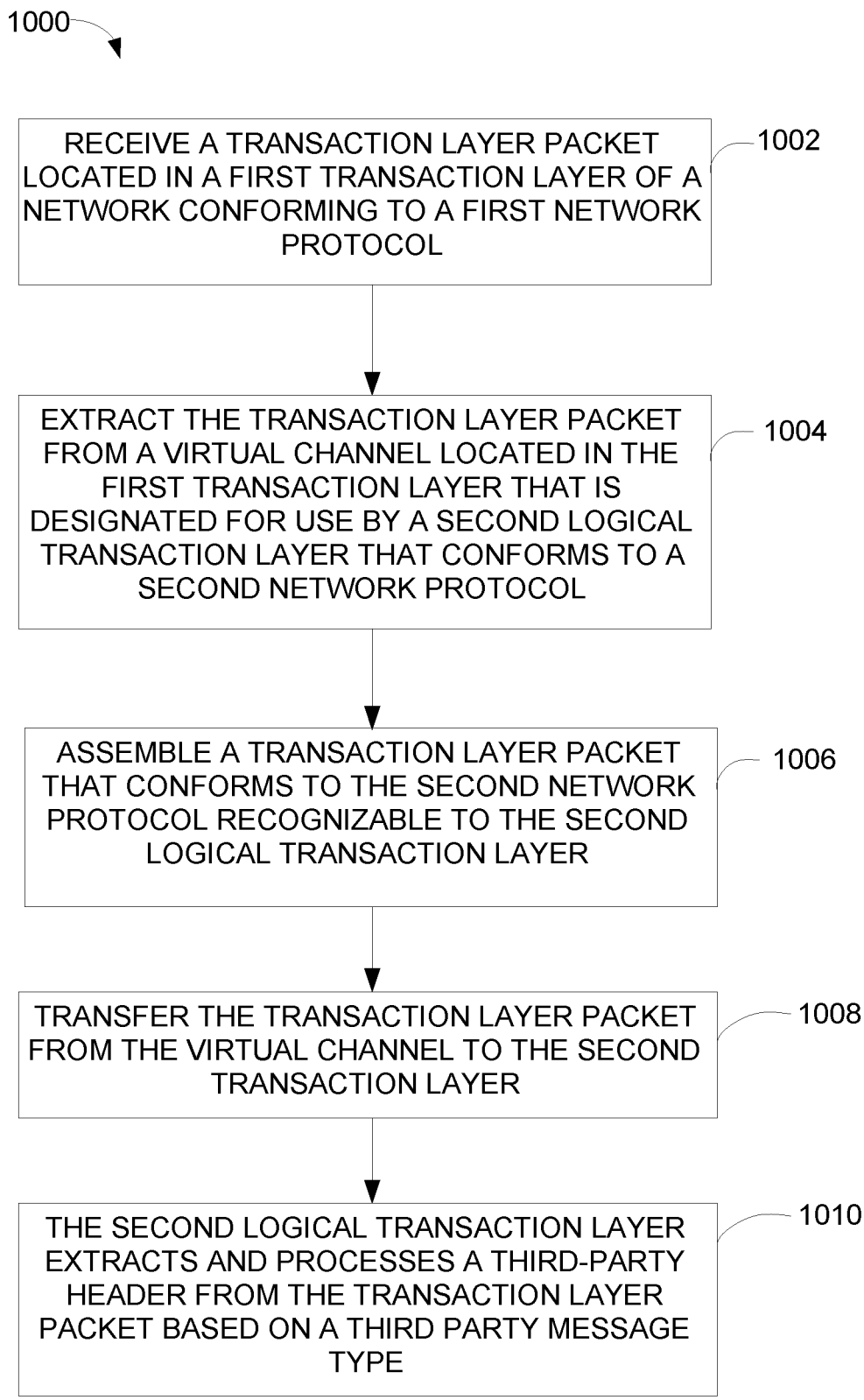
FIG. 10 is a flow diagram depicting a method for transparently overlaying a logical transport network over an existing physical transport network according to an example.

FIG. 10 is a flow diagram depicting a second method 1000 for transparently overlaying a logical transport network over an existing physical transport network according to an example. Aspects of the method 1000 may be understood with reference to FIGS. 1-8. The method 1000 begins at block 1002, where computer system 602 receives a transaction layer packet located in a first transaction layer of a network conforming to a first network protocol. At block 1004, the computer system 602 extracts the transaction layer packet from a virtual channel located in the first transaction layer that is designated for use by a second logical transaction layer that conforms to a second network protocol. At least one attribute contained within the transaction layer packet is not recognizable to the first transaction layer, but remaining fields of the packet are recognizable by the first transaction layer. The remaining fields of the packet are unique to the second logical transaction layer.

In an example, the transaction layer packet includes a third party identifier recognizable to the first transaction layer, and a third party message type and a third-party header recognizable to the second logical transaction layer. At block 1006, the computer system 602 assembles a transaction layer packet that conforms to the second network protocol recognizable to the second logical transaction layer. At block 1008, the computer system 602 transfers the transaction layer packet from the virtual channel to the second transaction layer.

In an example, the transaction layer packet includes a third party identifier recognizable to the first transaction layer, and a third party message type and a third-party header recognizable to the second logical transaction layer. At block 1010, the second logical transaction layer of the computer system 602 extracts and processes the third-party header from the transaction layer packet based on the third party message type.

In an example, the second transaction layer leverages existing properties of the physical layer, but employs class of service (COS) attributes that are unique to the second logical transaction layer. The COS attributes are at least one of low latency attributes and protocol attributes.

In an example, the second network protocol is cache coherent. In an example, the first network protocol is the PCIe protocol and the second network protocol is the CCIX protocol.

Figure 11:
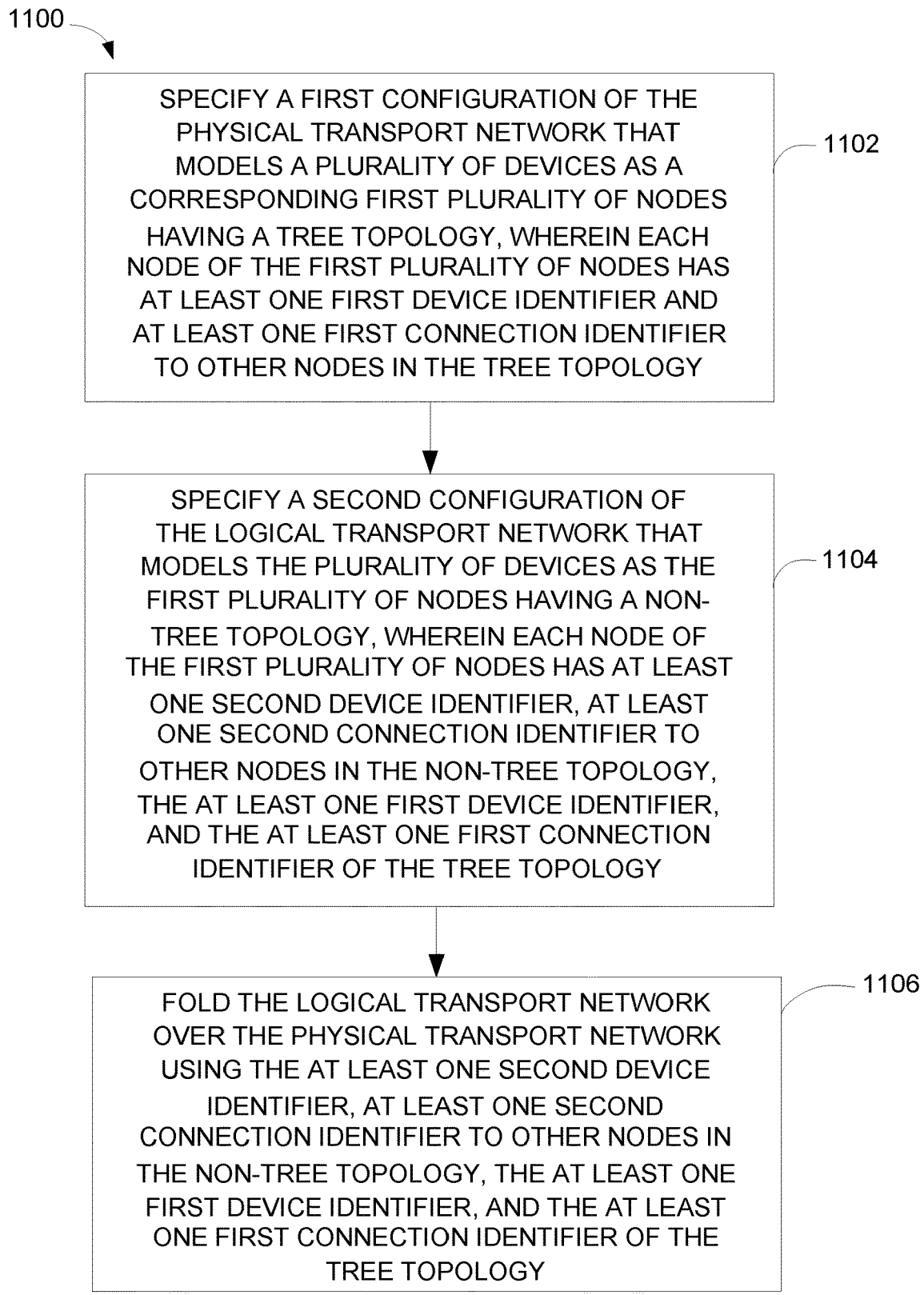
FIG. 11 is a flow diagram depicting a method for overlaying a first logical transport of a first transport protocol having an arbitrary topology over a physical transport of a second transport protocol having a tree topology according to an example.

FIG. 11 is a flow diagram depicting a method 1100 for overlaying a first logical transport of a first transport protocol having an arbitrary topology over a physical transport of a second transport protocol having a tree topology according to an example. Aspects of the method 1100 may be understood with reference to FIGS. 1-8. The method 1100 begins at block 1102, where the computer system 602 specifies a first configuration of the physical transport network that models a plurality of devices as a corresponding first plurality of nodes having a tree topology, wherein each node of the first plurality of nodes has at least one first device identifier and at least one first connection identifier to other nodes in the tree topology. At block 1104, the computer system 602 specifies a second configuration of the logical transport network that models the plurality of devices as the first plurality of nodes having a non-tree topology, wherein each node of the first plurality of nodes has at least one second device identifier, at least one second connection identifier to other nodes in the non-tree topology, the at least one first device identifier, and the at least one first connection identifier of the tree topology. At least one attribute contained within the transaction layer packet is not recognizable to the first transaction layer, but remaining fields of the packet are recognizable by the first transaction layer. The remaining fields of the packet are unique to the second logical transaction layer. At block 1106, the computer system 602 folds the logical transport network over the physical transport network using the at least one second device identifier, at least one second connection identifier to other nodes in the non-tree topology, the at least one first device identifier, and the at least one first connection identifier of the tree topology.

In an example, the physical transport network conforms to a first physical transport protocol and the logical transport network conforms to a second logical transport protocol. The first physical transport protocol may be the PCIe physical transport protocol and the second logical transport protocol may be the CCIX logical transport protocol. In an example, the second network protocol is cache coherent. Each of the multi-port components that participate in the PCIe transport protocol declares itself as one of a PCIe root, PCIe switch, or a PCIe endpoint.

The at least one first connection identifier and the at least one second connection identifier correspond to a device port in the tree topology and in the non-tree topology. A device is specified as a single multi-port node in the non-tree topology while being specified as two or more distinct nodes each having a single connection in the tree topology.

In an example, communication and routing across the tree topology comprises traversing the tree topology based on the first device identifier and the at least one first connection identifier in a tree topology physical layer protocol packet and a tree topology identifier based routing table. Communication and routing across the non-tree topology comprises traversing the non-tree topology based on the second device identifier, the at least one second connection identifier, the at least one first device identifier, and the at least one first connection identifier of the tree topology in a non-tree topology logical transaction layer packet and a non-tree topology identifier based routing table.

In an example, a transaction layer packet (TLP) of the first transport protocol includes the at least one second device identifier, the at least one second connection identifier to other nodes in the non-tree topology, the at least one first device identifier, and the at least one first connection identifier of the tree topology. The device transmits the transaction layer packet to a second device in the non-tree topology using the at least one second device identifier an at least one second connection identifier over a data link layer and a physical layer of the tree-topology using the at least one first device identifier and the at least one first connection identifier.

In an example, the second transaction layer leverages existing properties of the physical layer, but employs class of service (COS) attributes that are unique to the second logical transaction layer. The COS attributes are at least one of low latency attributes and protocol attributes.

In an example, the plurality of nodes in the tree topology serves a first function in a first transaction layer corresponding to the first transport protocol while the plurality of nodes in the non-tree topology serves a second function in a transaction layer corresponding to the second transport protocol unknown to the first transport protocol. The second transport protocol has transport routing properties that are independent of tree-based routing properties of the first transport protocol. The transport routing properties of the second transport protocol are implemented using logical transport data structures that include at least one of a system address map (SAM) data structure between nodes in the tree topology and the second topology and a device identifier map (IDM) data structure of nodes in the tree topology and the second topology. The second transport protocol has an identification scheme that identifies a multi-port node as a plurality of single port nodes in the first transport protocol while identifying the multi-port node as one common node in the second transport protocol.

In an example, a transaction layer packet of the first transport protocol includes a third party identifier recognizable to a first transaction layer of the first transport protocol, and a third party message type and a third-party header recognizable to a second logical transaction layer of the second transport protocol. In an example, the first transaction layer transmits the transaction layer packet over a data link layer and a physical layer that conforms to the first transport protocol. In an example, the second transaction layer leverages existing properties of the physical layer, but employs class of service (COS) attributes that are unique to the second logical transaction layer. The COS attributes are at least one of low latency attributes and protocol attributes.

Figure 12:
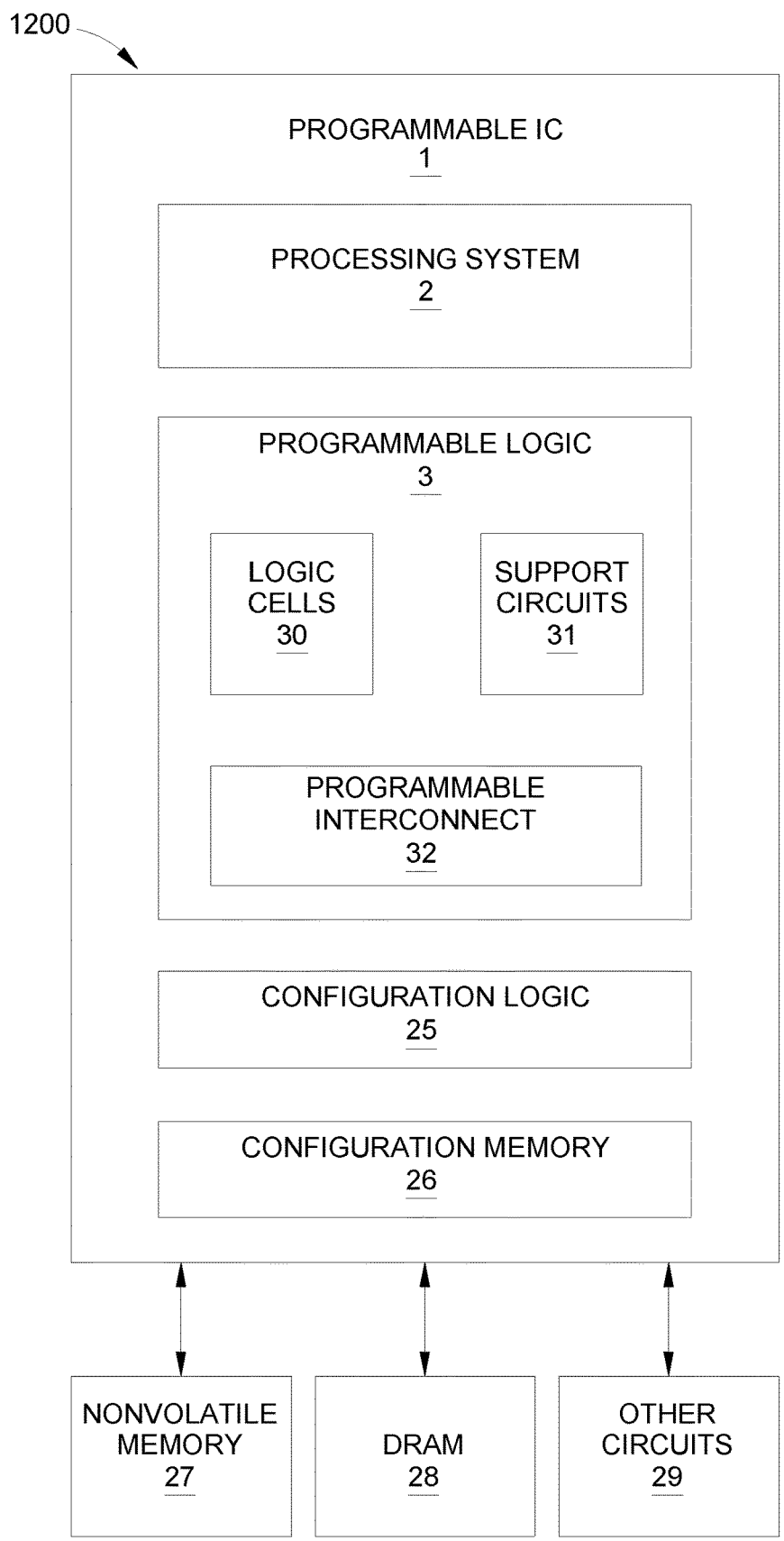
FIG. 12 is a block diagram depicting a programmable IC according to an example.

FIG. 12 is a block diagram depicting a programmable IC 1 according to an example. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like.

Figure 13:
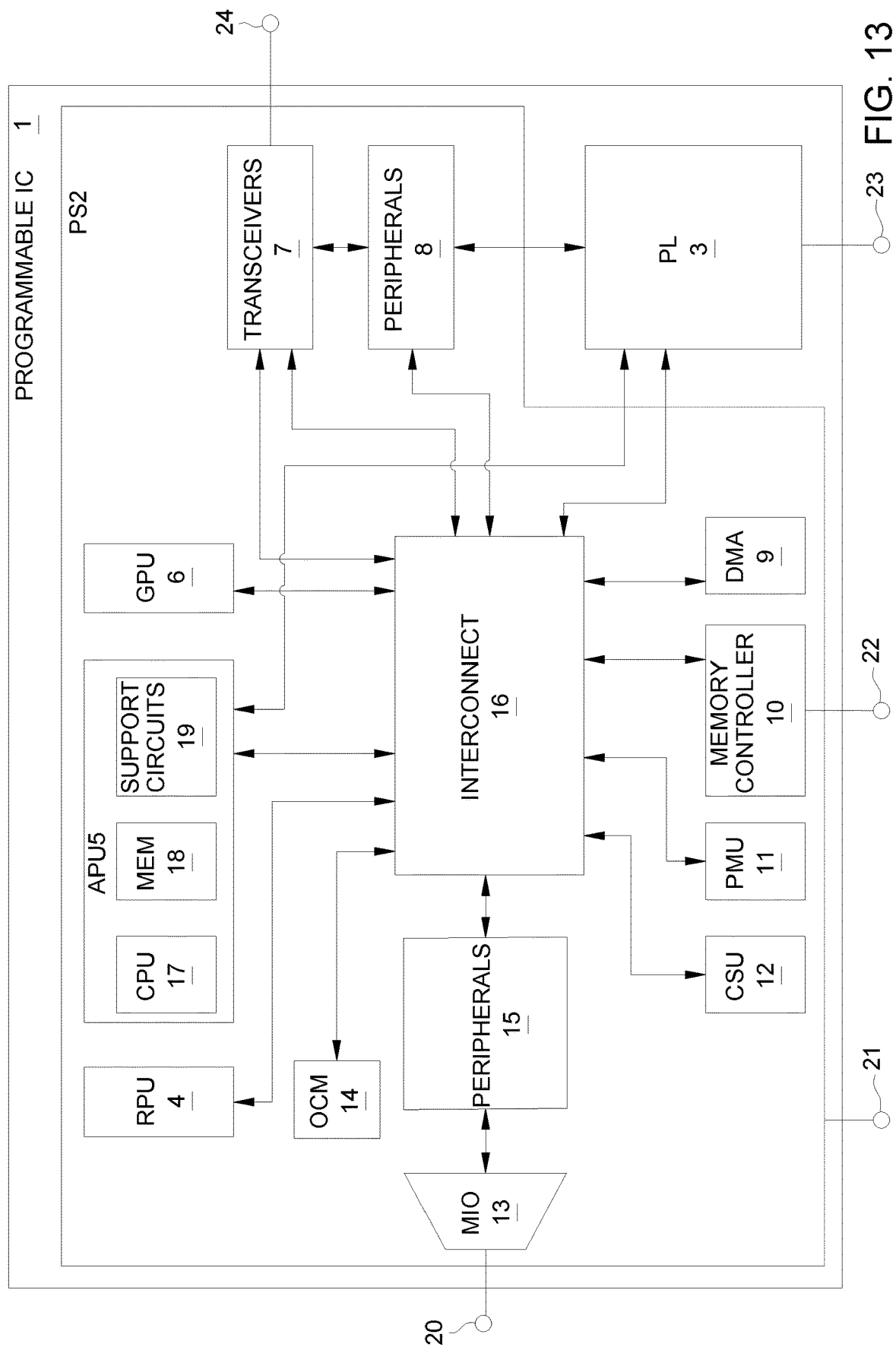
FIG. 13 is a block diagram depicting a System-on-Device (SoC) implementation of a programmable IC according to an example.

FIG. 13 is a block diagram depicting a System-on-Device (SoC) implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-device memory (OCM) 14, transceivers 7, peripherals 8, interconnect 16, DMA circuit 9, memory controller 10, peripherals 15, and multiplexed IO (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 13, the programmable IC 1 can be used in the peripheral device 122 and can function as described above. The accelerator circuit 130 can be programmed in the PL 3 and function as described above. In another example, the functionality of the hardware 104 described above can be implemented using the PS 2, rather than through hardware of a computing system. In such case, the software 606 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, MGTs, and the like.

Figure 14:
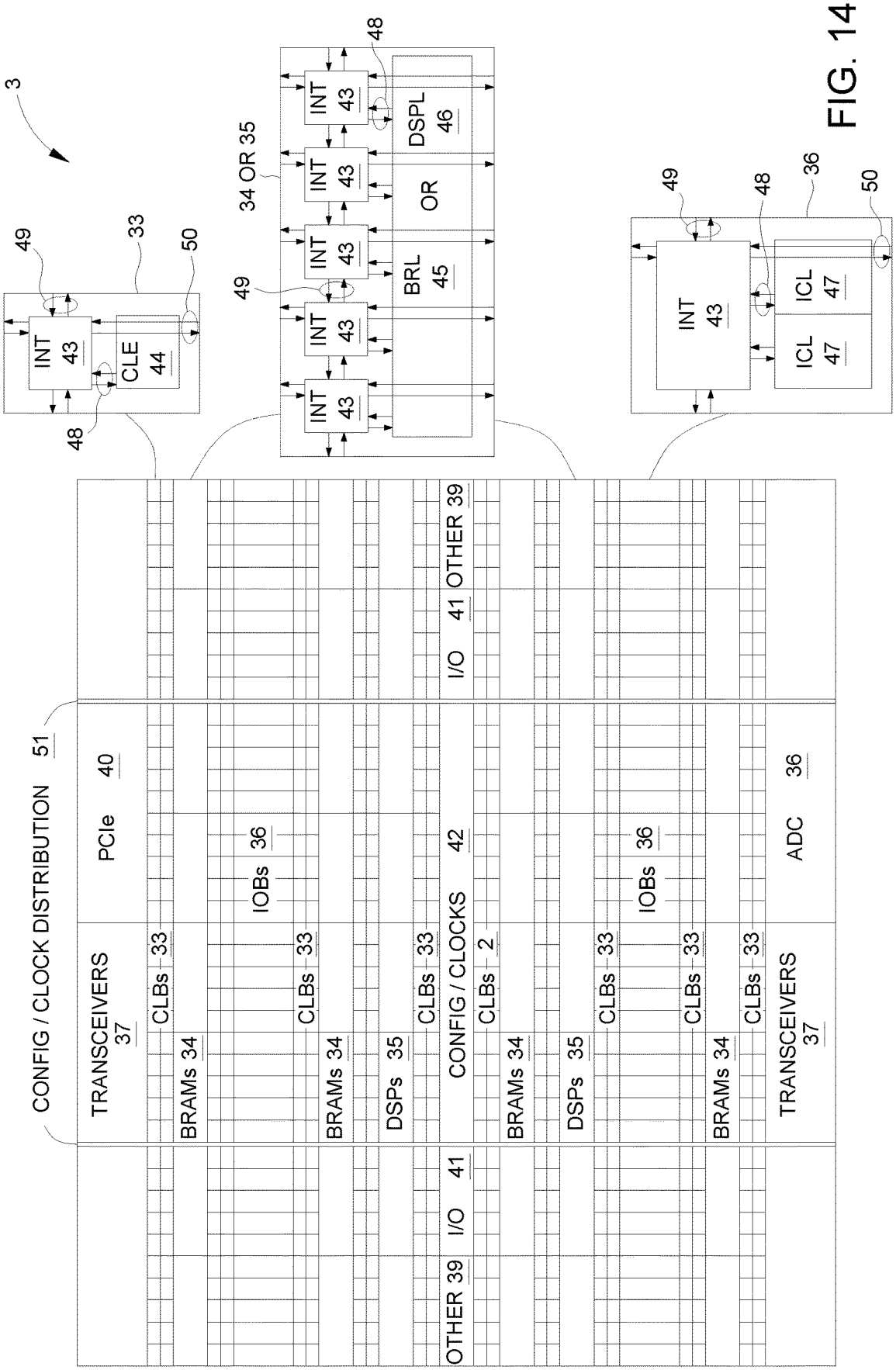
FIG. 14 illustrates a field programmable gate array (FPGA) implementation of a programmable IC according to an example.

FIG. 14 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 14. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 14) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 141 include additional logic blocks that disrupt the regular columnar structure making up a large part of the FPGA. The additional logic blocks can be programmable blocks and/or dedicated logic.

Note that FIG. 14 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 14 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A method of transparently overlaying a logical transport network over an existing physical transport network, comprising:
    specifying a first configuration of the physical transport network that models a plurality of devices as a corresponding first plurality of nodes having a tree topology, wherein each node of the first plurality of nodes has at least one first device identifier and at least one first connection identifier to other nodes in the tree topology;
    specifying a second configuration of the logical transport network that models the plurality of devices as the first plurality of nodes having a non-tree topology, wherein each node of the first plurality of nodes has at least one second device identifier, at least one second connection identifier to other nodes in the non-tree topology, the at least one first device identifier, and the at least one first connection identifier of the tree topology; and
    folding the logical transport network over the physical transport network using the at least one second device identifier, the at least one second connection identifier to other nodes in the non-tree topology, the at least one first device identifier, and the at least one first connection identifier of the tree topology.

2. The method of claim 1, wherein the physical transport network conforms to a first physical transport protocol and the logical transport network conforms to a second logical transport protocol.

3. The method of claim 2, wherein the first physical transport protocol is the peripheral component interconnect express (PCIe) physical transport protocol and the second logical transport protocol is a cache coherence interconnect for accelerators (CCIX) logical transport protocol.

4. The method of claim 3, wherein each of multi-port components that participate in the PCIe physical transport protocol declares itself as one of a PCIe root, PCIe switch, or a PCIe endpoint.

5. The method of claim 1, wherein said specifying the first configuration and said specifying the second configuration define pairwise relationships between the plurality of devices such that a device of the plurality of devices having a node position in the tree topology has a different node position in the non-tree topology.

6. The method of claim 1, wherein each device of the plurality of devices simultaneously identifies itself as part of both a tree graph and a non-tree graph.

7. The method of claim 1, wherein the at least one first connection identifier and the at least one second connection identifier correspond to a device port in the tree topology and in the non-tree topology.

8. The method of claim 1, wherein a device of the plurality of devices is specified as a single multi-port node in the non-tree topology while being specified as two or more distinct nodes each having a single connection in the tree topology.

9. The method of claim 1, wherein the tree topology is unaware of the at least one second device identifier and the at least one second connection identifier to other nodes in the non-tree topology.

10. The method of claim 1, wherein communication and routing across the tree topology comprises traversing the tree topology based on the first device identifier and the at least one first connection identifier in a tree topology physical layer protocol packet and a tree topology identifier based routing table.

11. The method of claim 1, wherein communication and routing across the non-tree topology comprises traversing the non-tree topology based on the second device identifier, the at least one second connection identifier, the at least one first device identifier, and the at least one first connection identifier of the tree topology in a non-tree topology logical transaction layer packet and a non-tree topology identifier based routing table.

12. The method of claim 1, wherein modeling each node of the first plurality of nodes having the non-tree topology comprises modeling each node of the first plurality of nodes as a PCIe switch node having multiple ports.

13. The method of claim 2, wherein a transaction layer packet of the first physical transport protocol includes the at least one second device identifier, the at least one second connection identifier to other nodes in the non-tree topology, the at least one first device identifier, and the at least one first connection identifier of the tree topology.

14. The method of claim 13, wherein a first device of the plurality of devices transmits the transaction layer packet to a second device of the plurality of devices in the non-tree topology using (i) the at least one second device identifier and the at least one second connection identifier over a data link layer and (ii) a physical layer of the tree topology using the at least one first device identifier and the at least one first connection identifier.

15. A system that overlays a logical transport network of a first transport protocol having an arbitrary topology over a physical transport network of a second transport protocol having a tree topology, comprising:
 a computer processor; and
 a memory coupled to the computer processor, the computer processor configured to execute code located in the memory for:
  specifying a first configuration of the physical transport network that models a plurality of devices as a corresponding first plurality of nodes having the tree topology, wherein each node of the first plurality of nodes has at least one first device identifier and at least one first connection identifier to other nodes in the tree topology;
  specifying a second configuration of the logical transport network that models the plurality of devices as the first plurality of nodes having a non-tree topology, wherein each node of the first plurality of nodes has at least one second device identifier, at least one second connection identifier to other nodes in the non-tree topology, the at least one first device identifier, and the at least one first connection identifier of the tree topology; and
  folding the logical transport network over the physical transport network using the at least one second device identifier, the at least one second connection identifier to other nodes in the non-tree topology, the at least one first device identifier, and the at least one first connection identifier of the tree topology.

16. The system of claim 15, wherein the physical transport network conforms to a first physical transport protocol and the logical transport network conforms to a second logical transport protocol.

17. The system of claim 16, wherein the first physical transport protocol is a peripheral component interconnect express (PCIe) physical transport protocol and the second logical transport protocol is a cache coherence interconnect for accelerators (CCIX) logical transport protocol.

18. A non-transitory computer-readable medium comprising instructions that when executed by a computing device cause the computing device to perform a method for overlaying a logical transport network of a first transport protocol having an arbitrary topology over a physical transport network of a second transport protocol having a tree topology, the method comprising:
 specifying a first configuration of the physical transport network that models a plurality of devices as a corresponding first plurality of nodes having the tree topology, wherein each node of the first plurality of nodes has at least one first device identifier and at least one first connection identifier to other nodes in the tree topology;
 specifying a second configuration of the logical transport network that models the plurality of devices as the first plurality of nodes having a non-tree topology, wherein each node of the first plurality of nodes has at least one second device identifier, at least one second connection identifier to other nodes in the non-tree topology, the at least one first device identifier, and the at least one first connection identifier of the tree topology; and
 folding the logical transport network over the physical transport network using the at least one second device identifier, the at least one second connection identifier to other nodes in the non-tree topology, the at least one first device identifier, and the at least one first connection identifier of the tree topology.

19. The non-transitory computer-readable medium of claim 18, wherein the physical transport network conforms to a first physical transport protocol and the logical transport network conforms to a second logical transport protocol.

20. The non-transitory computer-readable medium of claim 19, wherein the first physical transport protocol is a peripheral component interconnect express (PCIe) physical transport protocol and the second logical transport protocol is a cache coherence interconnect for accelerators (CCIX) logical transport protocol.

* * * * *